United States Patent

Quillier

[15] 3,636,371

[45] Jan. 18, 1972

[54] SAW-TOOTH VOLTAGE WAVE GENERATOR INCLUDING RAMP VOLTAGE SOURCE CONTROLLED BY DUAL STABLE STATE TUNNEL-DIODE SWITCHABLE PERIODICALLY BY A GATING CIRCUIT

[72] Inventor: Jean Georges Quillier, Saint-Etienne, France

[73] Assignee: Constructions Radioelectriques et Electroniques du Centre, Saint-Etienne (Loire), France

[22] Filed: Aug. 13, 1969

[21] Appl. No.: 849,755

[30] Foreign Application Priority Data

Aug. 14, 1968 France ....................................162982

[52] U.S. Cl. ..............................307/228, 307/322, 328/183

[51] Int. Cl. ......................................H03k 4/50, H03k 4/56

[58] Field of Search ..............................307/228, 286, 322; 328/181–185

[56] References Cited

UNITED STATES PATENTS

| | | | |
|---|---|---|---|
| 3,124,706 | 3/1964 | Alexander | 307/228 |
| 3,138,764 | 6/1964 | Dalton et al. | 307/228 X |
| 3,277,319 | 10/1966 | Stevens, Jr. | 307/286 X |
| 3,339,088 | 8/1967 | Dillard | 307/228 X |
| 3,440,448 | 4/1969 | Dudley | 307/228 X |
| 3,484,624 | 12/1969 | Rasiel et al. | 307/228 X |

*Primary Examiner*—Stanley D. Miller, Jr.
*Attorney*—Pierce, Scheffler & Parker

[57] ABSTRACT

A saw-tooth wave voltage generator comprises an integrator formed by a capacitor charged by means of an invariable current associated with a stable two-state tunnel-diode triggering circuit. One of the states of the diode controls return of the saw-tooth wave voltage to a starting reference level by means of a control amplifier which includes a comparator stage to which is applied the reference voltage and the output voltage of the generator, and the other state of the tunnel-diode releases operation of the generator. A second control amplifier interconnected with the first one and which takes its input voltage from the comparator stage of the latter functions to detect arrival of the saw-tooth wave voltage near the value of the reference voltage and applies it to the triggering circuit to control the biasing of the tunnel diode.

6 Claims, 4 Drawing Figures

INVENTOR

Jean Georges Quillier

By

Prince, Schiffler & Parker

Attorneys

INVENTOR

Jean Georges Quillier

By Pierce, Scheffler & Parker

Attorneys

SAW-TOOTH VOLTAGE WAVE GENERATOR INCLUDING RAMP VOLTAGE SOURCE CONTROLLED BY DUAL STABLE STATE TUNNEL-DIODE SWITCHABLE PERIODICALLY BY A GATING CIRCUIT

The present invention relates to improvements to sawtooth wave generators, particularly of the Miller integrators kind, with a view to obtaining both a more accurate triggering as well as a good stabilizing of the reference potential of the output voltage.

It is known that the name of sawtooth wave generators is given to circuits producing a voltage whose amplitude varies linearly as a function of time from a reference voltage to a maximum voltage, and then drops to its initial value before a new operational cycle.

Such circuits are generally made by an integrator circuit, of the Miller or bootstrap type, to which is associated a triggering circuit, namely, a tunnel diode, for instance and a chopping circuit.

The known generator circuits meet one or more of the following conditions, but said conditions cannot be simultaneously fulfilled:

a. stability of the reference potential of the sawtooth wave, b. triggering the generator after stabilizing at the reference level, c. minimum inactive interval between two consecutive sawteeth, compatible with the two preceding conditions.

Known processes enable, by means of an output voltage control loop at a reference value during the return phase of the sawtooth voltage, to obtain a satisfactory long term stability of the inactive voltage of the sawtooth wave.

A first method consists of preventing, by means of a temporizing circuit, any new triggering of the generator during a time covering widely, the time strictly necessary for the return and stabilizing of the output voltage. If the integration duration is widely variable, this also applies to the prevention duration, which usually necessitates a supplementary switching. Furthermore, the prevention duration widely goes beyond the moment from which a new triggering would be possible: the time corresponding to this method is not satisfactory and is incompatible with condition (c) above.

A second method consists of detecting the actual stabilizing of the control loop. Such process has the advantage of doing away with the switching of the preceding temporizing circuit. An aperiodic circuit can then be used which applies the fact that the control of the output voltage of an integrator is then effected. This control is obviously stabilized when the integration current is zero, and this must be detected by checking the state of the signal in the control loop. This check can only be made with limited accuracy, due, particularly, to the fact that stability considerations in the high-frequency field limit the gain and band pass of the control loop. At the moment when the integrator can again begin another operational cycle, the preceding condition (c) can only be approximately obtained.

The object of the invention is to have the three preceding characteristics simultaneously obtained by means of a supplementary control, interconnected with the above control loop, and ensuring a precise point for triggering the generator.

The invention may particularly be applied to scanning generators for cathodic oscilloscopes in which the repetition frequency of the sawtooth wave must be regulated within fairly wide limits.

The invention relates to improvements of sawtooth wave voltage generators of the type comprising an integrator formed by a capacitor charged by means of an invariable current associated with a stable two-state tunnel-diode and a triggering circuit, one of said two states controlling the return of the sawtooth wave voltage to a reference value by means of a control amplifier, comprising a comparator stage to which are respectively applied the reference voltage and the output voltage of the generator, the other one of said two states causing the integrator to operate, and in which the triggering from one of said stable states to the other is determined, on the one hand, by a signal coming from a limiting circuit detecting the arrival of the sawtooth wave at a predetermined potential, and on the other hand, by a control pulse.

These improvements ensure, prior to this latter triggering, a precise return of the sawtooth wave voltage to the reference value, and said improvements are characterized in that a second control amplifier which is interconnected with the first one and the input voltage of said second control amplifier is taken in the comparator circuit of the first amplifier so as to detect the arrival of the sawtooth wave voltage near the value of the reference potential of the sawtooth wave voltage, said input voltage being applied on the triggering circuit for controlling the biasing of the tunnel-diode.

The return of the reference potential of the sawtooth wave is thus effected via the first control amplifier, formed by a low-drift comparator stage which provides a first control loop. A second amplifier detects in this first control loop, the arrival of the sawtooth wave voltage near the value of the reference potential. Said voltage then begins to bias the tunnel-diode controlling the operation of the generator thereby playing the part of a gate with respect to the triggering pulses. The biasing voltage of the diode is then reached, and when it is sufficient to enable the action of the triggering pulses, the corresponding circuit slows down the operating of the first control loop, then stops the same. This latter step takes place while very slightly deforming (less than 1/20,000th) the reference potential, which ensures an almost constant starting value of the sawtooth wave.

There results from these arrangements an improvement of the operating of the generator with regard to the accuracy of the signals supplied and a simplification of the switching members annexed thereto.

For a better understanding of the invention, an example of application to a generator of the Miller integrator type will now be described but without being restricted to this type of generator.

In the accompanying drawings, given by way of nonrestrictive examples:

Figure 1:
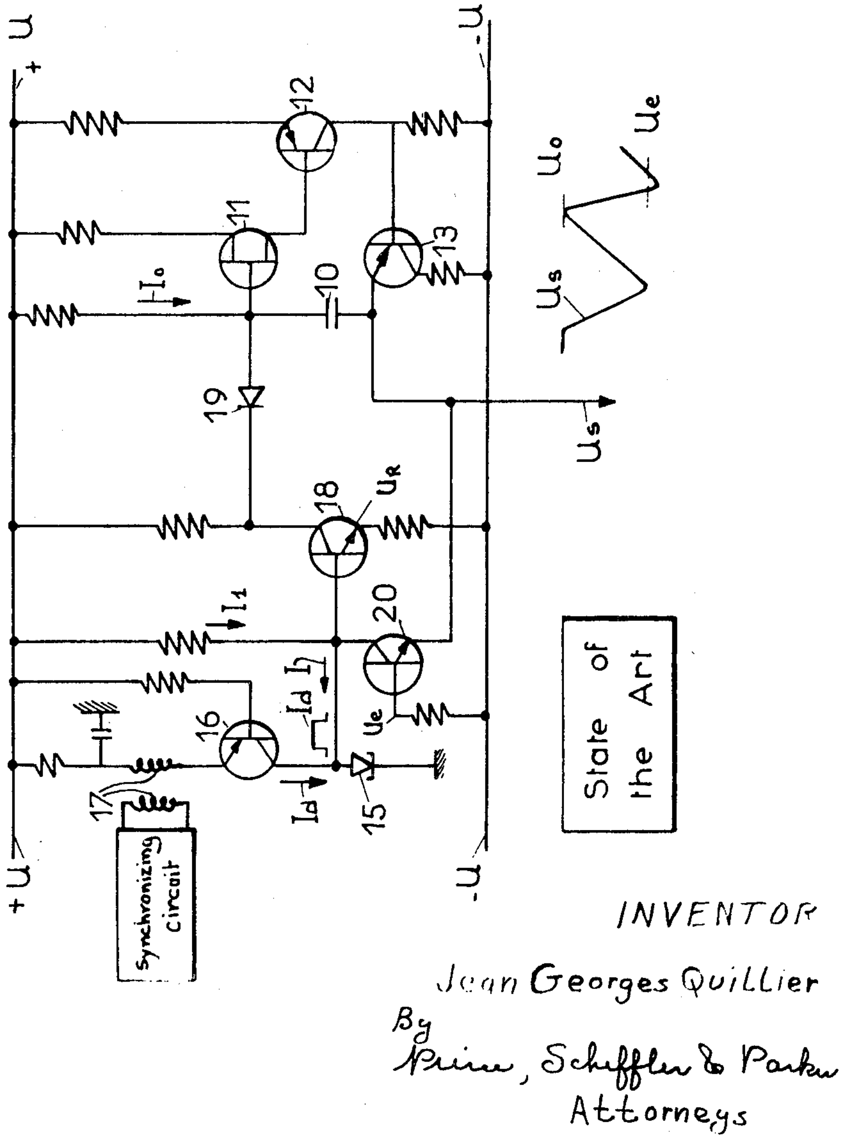
FIG. 1 shows a known type generator circuit as state of the art.

FIG. 1 shows a generator with a Miller integrator of known type and fed between two wires −U, +U. In this embodiment, a ramp generator means is constituted by a capacitor 10 charged by a constant current $I_o$ through a fixed resistance. The voltage appearing at the terminals of the capacitor 10 is amplified by means of a field effect transistor 11 with a high input impedance, a wide gain transistor 12 and an impedance-lowering transistor 13 on whose emitter the output signal $U_s$ is received. The charge of the capacitor is controlled by an auxiliary triggering circuit comprising a tunnel-diode 15 connected into the collector circuit of a transistor 16 on whose emitter are applied triggering or synchronizing pulses from a synchronizing circuit by means of a transformer 17. The transistor 16, on the base of which is applied a constant potential, thus provides the diode 15 with current pulses $I_d$ calibrated in duration and amplitude.

Figure 2:
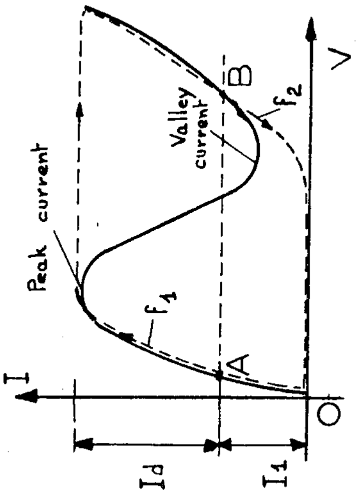
FIG. 2 is an explanatory diagram of the working of the associated tunnel-diode.

FIG. 2 shows the characteristics of the diode 15 which is sensitized or biased by a fixed current $I_1$ supplied on its anode, the amplitude of said current being comprised between the peak current and the valley current.

The anode of the diode 15 is connected to the base of a transistor 18, the collector of which being connected to the capacitor 10 by means of a diode 19, and the emitter being raised to a reference potential $U_R$.

Lastly, a transistor 20 having through a resistor connected to the wire U the collector connected in the anode circuit of the diode 15 and the emitter connected to the output of the integrator circuit forms a circuit limiting the sawtooth wave at a level determined by a potential $U_e$ applied on its base.

By referring to the characteristics of FIG. 2, one supposes the diode is kept in its rest state A under the effect of the current $I_1$. In these conditions, the transistor 18 is not conductive and the diode 19 is passing, so that the capacitor 10 is no longer charging or discharging. When a triggering pulse $I_d$ reaches the diode 15, said diode switches and passes into a second state B following the course shown in dotted lines in FIG. 2 and in the direction $f_1$. The triggering square wave makes the transistor 18 conductive and is amplified by said transistor which, by inverting the polarization of diode 19, causes said diode to be nonconductive. The capacitor 10 brought to potential $U_o$ then begins to charge with a constant current and the voltage on emitter of the transistor 13 at the output of the generator varies linearly as a time function. When this voltage has reached the limiting potential $U_e$, the transistor 20 becomes conductive and, transmitting the biasing current $I_1$, brings back the diode 15 to its rest state A (course taken along the dotted line of FIG. 2, in the direction $f_2$). Then, the components 18 and 19 respectively become nonconductive and conductive, enabling the capacitor 10 to discharge down to the balancing potential fixed by the reference potential $U_R$.

As it has been already stated, this known device has particularly the two following disadvantages:

a. the potential from which the capacitor 10 begins to charge which determines the reference potential $U_o$ of the sawtooth wave representing the output signal $U_s$ is poorly defined, owing to the vagueness of the components, the cumulated deviations of the emitter-base potentials of the transistors, the voltage from which the diode 19 becomes passing and the source-grid voltage of the transistor 11.

b. untimely triggering of the integrator is possible from the moment when the limit voltage is reached, preventing the output voltage of the integrator from returning to the reference voltage $U_o$ before supplying a new sawtooth wave. There results therefrom an erratic triggering (or "jitters") which is shown on the next following sawtooth wave by a more reduced amplitude, or on the screen of the cathodic tube by an advance of scanning. If, for instance, the sawtooth wave is triggered at −1 percent of its reference potential, then it will miss on the second scanning 1 percent of its amplitude reckoned starting from its theoretical starting point. A phenomenon of this kind becomes particularly harmful if this second scanning triggers, at a predetermined value of its output voltage, the start of a second time base. The error on this starting moment is then 1 percent of the period of the first time base. It will be perceived that such disadvantages prevent the using of this generator as a scanning generator for a cathodic oscillograph.

Figure 3:
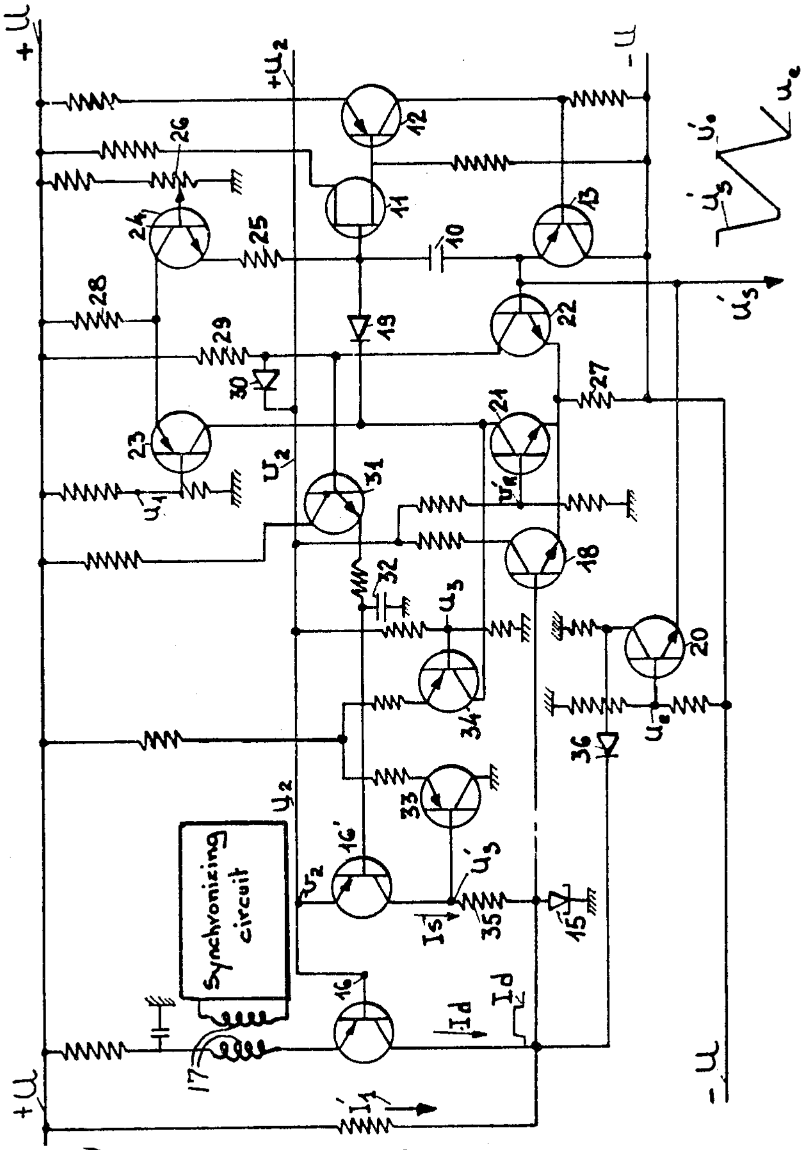
FIG. 3 shows the improved generator circuit according to the invention.

The invention provides a first improvement of this circuit consisting of looping the output voltage of the integrator with a two input control comparator stage on which a reference voltage is applied. In the circuit of the invention shown in FIG. 3, this differential stage is made by transistors 21, 22 of a PNP-type paired in emitter-base voltage characteristics and in temperature coefficient in relation to the thermic drift due to the variations of these voltages. A reference voltage $U'_R$ is applied on the base of the transistor 21 by way of a resistor bridge, while the output voltage $U'_s$ of the integrator is directly applied to the base of the transistor 22. The emitters of these two transistors 21 and 22 are connected to the emitter of the transistor 18 as well as to a common biasing resistance 27 connected to −U. The diode 19 is now connected into the circuit of the collector of the transistor 21.

During the integration phase, the tunnel-diode 15 biased by a fixed current $I'_1$ in position B, (FIG. 2) makes the transistor 18 conductive which absorbs all the current supplied by the resistance 27 to the differential stage of the comparator 21–22. No current then passes into the collectors of these transistors, and the diode 19 is biased in reverse, which enables the capacitor 10 to go on charging. The charge ends as previously, when the limiting voltage $U_e$ is reached, causing the saturation of the transistor 20, and the switching of the diode 15 in its state A (FIG. 2). The transistor 18 is again made nonconductive, and the stage 21–22 is again passing, this stage operating as a control amplifier of the reference potential of the sawtooth wave determined by the voltage $U'_R$. This reference potential is thus defined by the characteristics of the transistors 21, 22 and becomes established in the vicinity of the voltage $U'_R$.

The characteristics of the mounting can be further improved. It must be considered that the discharge current of the capacitor 10 which is supplied through the diode 19 by the transistor 21 slightly deviates the total current (constant in principle) of the emitter circuit of the transistors 21 and 22 of the comparator stage. One has thus sought to make constant the current of the transistors 21 and 22, or more exactly the collector current of the transistor 21 by means of two other complementary transistors 23, 24 mounted in parallel stage in the collector circuit of this transistor 21. As shown, the transistor 23 has its base raised to a positive fixed voltage $U_1$ by a resistor bridge. The collector-emitter circuit of the transistor 21 is in series with the resistance 25 of the integrator and the diode 19 in the collector circuit of the transistor 21. The base of the transistor 24 is at a voltage adjustable by means of a potentiometer 26 connected to +U and which enables the slope of the sawtooth wave of the generator to be continuously varied.

When the reference voltage is reached, the current supplied to the collector of the transistor 21 is constant and practically equal to the current in the common biasing resistance 28 of the stage 23–24. As the current passing into the resistance 27 is itself roughly constant, this means that this control seeks an equilibrium state for which the respective currents in the transistors 21 and 22 are perfectly defined, the differential input voltage of the stage 21–22 is thus made stable and reproducible.

The collector current of the transistor 21 being thus made constant, one can advantageously use the transistors 21–22 paired under the form of a double transistor possessing the characteristics previously specified.

The first control thus ensures with respect to the temperature, both the accuracy in absolute value and the independence of the reference potential of the sawtooth wave supplied by the generator.

It is now advisable to avoid untimely triggerings of the generator before its output voltage has dropped to the reference potential that has just been defined. To this end, the invention provides a control circuit to prevent the sensitization of the tunnel-diode during the whole of the time the capacitor of the generator is discharging, and which does not allow the applying of the sensitizing current unless the voltage of the sawtooth wave has reached a value very close to that of the reference potential.

The circuit which effects this second control essentially comprises the following elements (FIG. 3): a diode 30 placed into of the collector circuit of the transistor 22, said diode being connected to the wire +U via a resistance 29 and being biased by a low positive voltage $U_2$; a transistor 31, whose base is connected to the collector of the transistor 22, acts as a link with a transistor 16′ and plays the part of an impedance adaptor; a capacitance-resistance 32 is also introduced between the emitter of the transistor 31 and the base of the transistor 16′. The transistor 16′ is mounted in series with a resistance 35 and the tunnel-diode 15 to which it supplies part of the biasing current $I_s$. A terminal of the resistance 35 is connected to the base of a transistor 33 of a differential stage i.e., a two-input control comparator whose second transistor 34 has its base carried to a fixed low positive potential $U_3$ and its collector connected to the collector of the transistor 21. The transistor 16 and the synchronizing circuit 17 are connected to the anode of the tunnel-diode 15, and said anode is also connected to the resistance 35 as well as to a third way in which a current $I'_1$ is sent, said current being slightly greater than the valley current of the diode 15.

Figure 4:
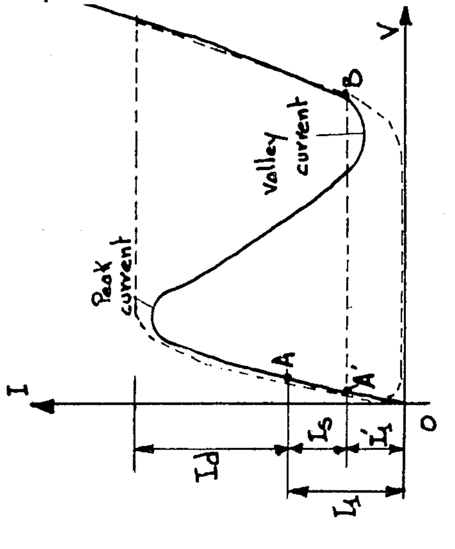
FIG. 4 is a corresponding explanatory diagram.

Under these conditions, the biasing current $I_1$ of FIG. 2 now consists of $I'_1+I_s$, as shown on the characteristic of FIG. 4, hence the existence of a new stable operational point A'. The partial biasing current $I'_1$ is such that the superimposing of the currents $I'_1+I_d$ on the tunnel-diode, in the absence of the current $I_s$ controlled by the transistor 16', is insufficient for causing the switching of the diode at B and the consecutive starting of the integrator to perform its integrating function.

The currents $I_1(I_1=I'_1+I_o)$ and $I_d$ of the tunnel-diode 15 depend on the value of the peak current $I_p$ of said diode. The relations between $I_d$, $I_s$, $I'_1$ and $I_p$ are approximately the following: $I_d=0.4I_p$, $I_s=0.35I_p$ and $I'_1=0.35I_p$ so that the summation of the currents $I_d+I_s+I'_1$ is approximately $1.11I_p$.

The prevention of biasing the diode 15 is effected as follows: at the beginning of the discharge of the capacitor 10, the collector current of the transistor 22 is zero or produces, at the terminals of the resistance 29, an insufficient voltage drop for making the diode 30 nonconductive. During this period, the voltage applied on the base of the transistor 16' and controlled by the voltage existing on the base of the transistor 31 causes said transistor 16' to be made nonconductive which consequently prevents the arrival of the current $I_s$ in the diode 15.

When the capacitor 10 reaches the end of discharging, the comparator stage 21–22 operates for controlling the reference level; at this moment, the current flowing into the transistor 22 is such that, because of dispersions on the components and the effect of temperature variations, a voltage drop occurs in the resistance 29 which is always sufficient to make the transistor 16' conducting through the transistor 31. The current $I_s$ can then reach the diode 15 to bias it. Before this operational step, the diode 30 limits the inverse base-emitter voltage of the transistor 16', whereby ensuring its protection.

Said inverse base-emitter voltage is applied through the transistor 31, connected in emitter-follower, and the magnitude of said voltage is the difference of the potentials supplied to the emitter of the transistor 16' and to the collector of the transistor 22. It is necessary to limit this inverse voltage and the diode 30 has been provided for that purpose. Said diode 30, moreover, plays the part of a threshold from which the second control is freed. As the comparator stage 21–22 has a considerable voltage gain, this control begins to play a part when the output voltage of the integrator (during the return of the sawtooth wave), is very close to its reference level.

The triggering pulses $I_d$ having a calibrated amplitude from the synchronizing circuit and the tunnel-diode being still biased through $I'_1$', the tunnel-diode can switch under the effect of a current $I_s$ of a given magnitude; a voltage $U'_3$ is applied to the base of the transistor 33 and the differential amplifier 33–34 becomes active.

The voltage $U_3$, towards which the voltage $U'_3$ tends to be by the means of the control, fixes the potential of the collector of the transistor 16' and hence regulates the biasing current supplied to the tunnel-diode through this transistor.

From this moment, the transistor 34 takes on the collector current of the transistor 21 the fraction necessary for stabilizing the current in the resistor 35 and in the diode 15 at the given intensity $I_s$. This slightly alters the working of the comparator stage 21–22: the current in the transistor 22 is such that when flowing through resistor 29, it creates in said resistor the sufficient voltage drop for releasing the transistor 16' and is thus precisely known.

The current in the transistor 21 results from the difference between the current in the resistor 27 and the one flowing through the transistor 22, and is thus also accurately known.

During the operating of this second control loop of the biasing current of the tunnel-diode, the above conditions are only very slightly modified, which corresponds to an uncertainty about the input differential voltage of the comparator stage 21–22, which is much less than one twenty-thousandth of the amplitude of the sawtooth wave.

A diode 36, connected in the collector circuit of the transistor 20, is used for insulating the diode 15 from the collector resistance of this transistor, except at the moment of the limiting stage, to prevent any deviation of the given intensity current passing through the diode 15.

The operation of the whole circuit is stabilized in high frequency by the capacitance-resistance circuit 32 which delays the action of the second control loop. Said capacitance is a low one and actually plays the part of a holdoff circuit solely for rapid scanning speeds. This is an advantage as compared with known circuits which necessitate great holdoff capacitances, which must be switched over with the integration circuit elements used, and changed for each shape of desired sawtooth waves.

When the generator is operating as relaxed and no longer as triggered, the current $I'_1$ may be increased by a fixed quantity corresponding to the amplitude of the calibrated triggering pulses $I_d$.

It is quite understood that the invention is not restricted to the single method of embodiment that has just been described by way of example, and that it is capable of modifications within the scope of the appended claims.

I claim:

1. A sawtooth voltage generator comprising:

a two stable state tunnel-diode having the anode thereof connected to a biasing current source and to a synchronization square wave generator and also to a gating circuit whereby said tunnel diode is maintained in a first stable state when said gating circuit is nonconductive;

a first two-input control comparator having one output and of which the first input thereof is connected to a first fixed potential source and the second input thereof is connected to the anode of said tunnel-diode, whereby said tunnel-diode is provided with an adjusted current for switching to a second stable state when said gating circuit is conductive;

a second two-input control comparator having two outputs of which the first output is connected to the output of said first control comparator;

a threshold circuit connected to the second output of said second control comparator and to said gating circuit, whereby said gating circuit remains nonconductive as long as said second output has not reached a given threshold; and a second fixed potential source connected to the first input of said second control comparator of which the second input thereof is connected to the output of a ramp generator means producing a ramp wave voltage, whereby said ramp wave voltage is returned to the value of said second fixed potential source when said tunnel-diode has reached the second stable state thus producing sawtooth voltage waves.

2. A generator according to claim 1 and which further includes a voltage-limiting circuit connected between the anode of said tunnel-diode and the output of said ramp generator means whereby the magnitude of the sawtooth waves is limited.

3. A generator according to claim 1 wherein said ramp generator means includes a capacitance connected in series with a charging resistance and the output of an amplifier having an input which is biased to an adjustable potential and whereby the slope of said ramp may be adjusted.

4. A generator according to claim 2 in which said first two-input control comparator circuit comprises a capacitance-resistance circuit connected between said second two input control comparator and said gating circuit.

5. A generator according to claim 2 in which said second two-input control comparator is formed by two transistors of the same type and paired in characteristic emitter-base voltages and in temperature coefficient with regard to thermic deviations due to the variations of these voltages.

6. A generator according to claim 5 and which further includes a parallel two-transistor stage connected to the transistor circuit of said second two-input control comparator on which said reference voltage is applied, one of the two transistors of said parallel stage having its base raised to a second reference voltage, and the other transistor of said parallel stage being in series with a resistance input of said ramp generator means and having its base connected to the slider component of a potentiometer.

* * * * *